May 22, 1951     O. F. QUARTULLO     2,553,940
POWER STEERING APPARATUS
Filed March 7, 1946     2 Sheets-Sheet 1
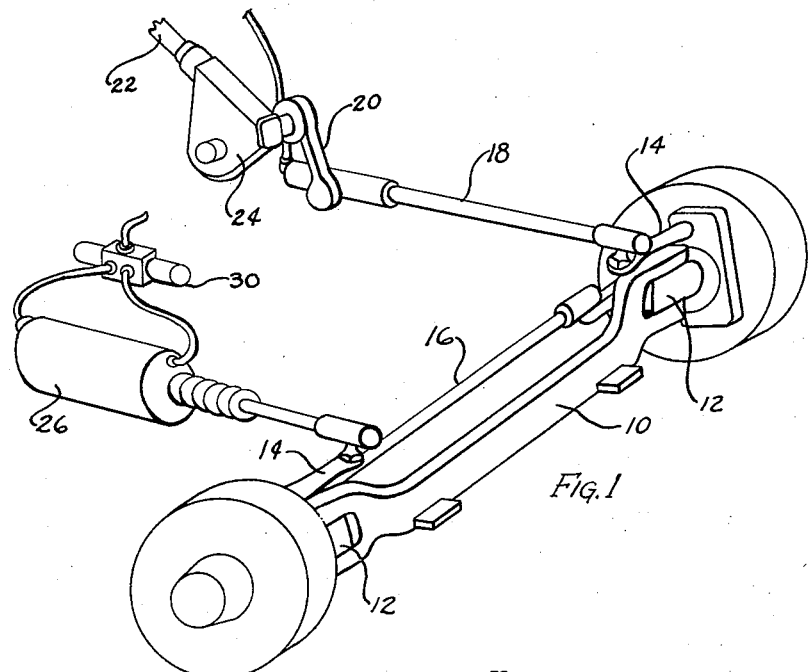
FIG. 1
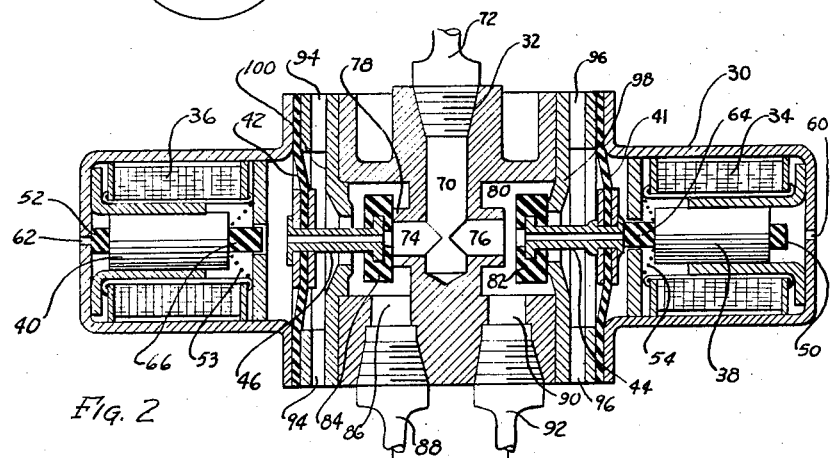
FIG. 2
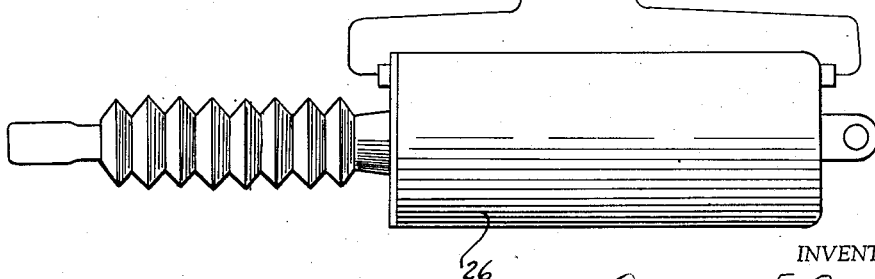
INVENTOR.
ORPHEUS F. QUARTULLO
BY A. H. Oldham

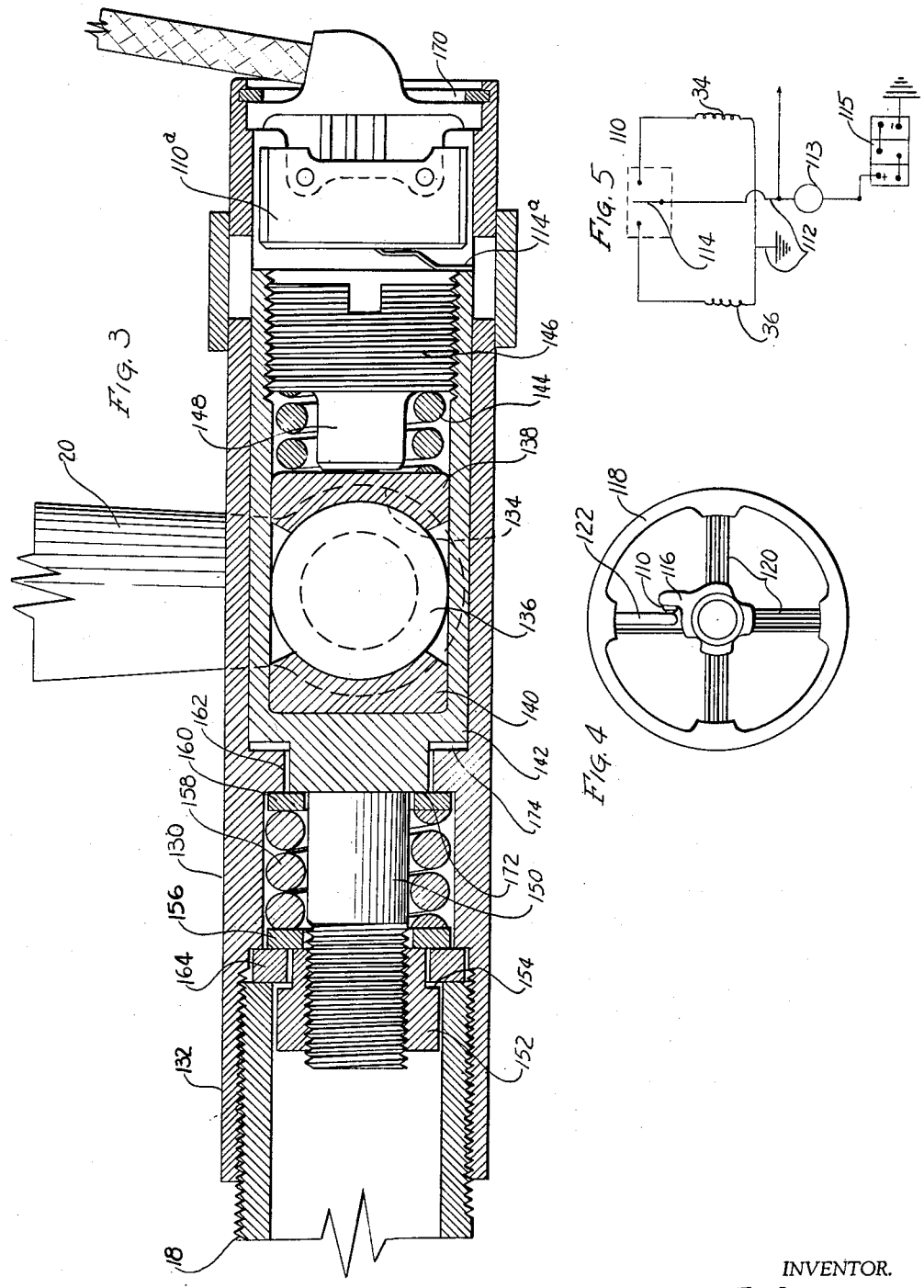

UNITED STATES PATENT OFFICE 2,553,940

POWER STEERING APPARATUS

Orpheus F. Quartullo, Cleveland, Ohio

Application March 7, 1946, Serial No. 652,637

4 Claims. (Cl. 180—79.2)

This invention relates to power steering apparatus for vehicles, particularly vehicles such as heavy trucks, or buses.

It has been recognized heretofore that it is often difficult to turn the wheels of a large bus or truck, for steering purposes, through the usual gear or linkage mechanism solely by the force which a driver can apply through the power of his own arms. As a result, some efforts have been made to provide power steering apparatus for trucks, buses, and other large trackless vehicles. Power steering apparatus has been particularly required where the vehicle is used on soft or yielding surfaces as distinguished from hard or paved surfaces. For example, many large vehicles of the type herein under consideration and exported from the United States into foreign countries having unimproved roads and unsurfaced roads have been found to require power steering as a requisite.

However, many of the efforts made heretofore to provide power steering apparatus for vehicles have resulted in complicated structures which are expensive to manufacture, and which are a constant source of annoyance and expense in the field to maintain in operation. Moreover, certain power steering apparatus designed heretofore has been of a character which necessitated its incorporation in the vehicle during the production thereof so that design changes on the vehicle were required which departed from standard production designs. Naturally, this is a source of added expense necessitating many engineering, design, and production changes. Lastly, efforts have been made in the direction of providing power steering apparatus which is adapted to be applied to the standard production model of the vehicle, without requiring any production changes therein. Such apparatus has had the advantage that it can be applied in the field, or by way of addition without production changes to those vehicles requiring power steering, for example, those going to the export trade. However, so far as I am aware, power steering apparatus of this type has been very difficult to install because it has been associated with the drag link connecting the pitman arm of the steering column with the steering knuckle on one of the wheel axles. Space is very much at a premium on the side of the motor having the steering mechanism, and it usually is a heart breaking and back breaking operation to attempt to install power steering apparatus in accord with practices known heretofore.

By way of summary, power steering apparatus of known types has been characterized by high production and maintenance costs, and difficulty of installation. As a result, known power steering apparatus has met with small favor and acceptance.

It is the general object of my invention to avoid and overcome the foregoing and other difficulties of and objections to prior power steering apparatus by the provision of apparatus of this type characterized by simplicity of construction, positiveness of operation, little or no maintenance problems, and ease of installation.

Another object of my invention is to provide power steering apparatus for large buses, trucks, and other similar vehicles, with the apparatus being adapted to be mounted on the side of the motor opposite to the manual steering mechanism, with electrical switch means operated by the manual steering mechanism for controlling the operation of the power steering apparatus.

Another object of my invention is the provision of new and useful electric switch means in association with manual steering mechanism, the electric switch means being adapted to control the operation of power steering apparatus.

Another object of my invention is to provide a control valve for super or subatmospheric pressure air, the control valve being electrically operated and characterized by ruggedness, simplicity, long life with little or no maintenance, and positiveness of operation.

The foregoing objects of my invention, and other objects which will become apparent as the description proceeds, are achieved by the provision of power steering apparatus for a vehicle having positive linkage for manually steering the wheels, said manual linkage including a steering wheel, a steering column secured to the steering wheel, a pitman arm operated by the column, and a drag link pivotally connecting the pitman arm with a steering knuckle on one of the wheel axles, the power steering apparatus being characterized by prime mover means connected to the steering knuckle on the wheel axle opposite to that to which the manual steering linkage is connected, means for controlling the forward, reverse, or neutral operation of the prime mover, and electric switch means associated with the manual steering linkage for energizing the control means to thereby operate the prime mover in direct response to movement of the steering wheel.

For a better understanding of my invention reference should be had to the accompanying drawings wherein:

Fig. 1 is a diagrammatic illustration in perspective view form of one embodiment or combination of apparatus incorporataing the principles of my invention.

Fig. 2 is a vertical cross-sectional view of the control valve forming a part of my invention, with the control valve being diagrammatically connected to the prime mover, specifically a fluid pressure motor, for effecting the power steering. In this figure of the drawings the control valve has been shown on a larger scale than the prime mover to facilitate an understanding of the construction and operation of the control valve.

Fig. 3 is a longitudinal sectional view taken on a diameter of the drag link type of electric switch means incorporated in Fig. 1 of the drawings. For clarity, Fig. 3 has been drawn on a larger scale than Fig. 1.

Fig. 4 is a plan view of a steering wheel incorporating flexible spokes and electric switch means. This structure provides an alternative manner of controlling the power steering apparatus.

Fig. 5 is a schematic wiring diagram of typical electrical connections employed in my invention.

Coming now to the detailed consideration of the structure illustrated in the drawings, and having particular reference to Fig. 1, the numeral 10 indicates the conventional front or other axle on the vehicle adapted to support a pair of wheels (not shown) for steering purposes. The wheels, of course, are rotatably supported on king pins 12 pivotally secured on substantially vertical axes to the ends of the axle 10. Each king pin 12 is provided with an integral steering knuckle 14, and the king pins are pivotally connected together by a tie rod 16 for simultaneous movement all in accord with well known and conventional practice. Steering knuckles 14 are provided on both of the king pins 12 as a matter of standard production design for the reason that vehicles used in this country are provided with left hand steering whereas those to be used abroad are often provided with right hand steering. The provision of steering knuckles 14 on both the right and left hand sides of the vehicle axle facilitate adapting the axle to either right or left hand steering.

Fig. 1 of the drawings illustrates the conventional left hand steering characterizing vehicles used in this country, and the steering mechanism includes a drag link 18 pivotally connected, usually with ball and socket joint, to the left hand steering knuckle 14. The other end of the drag link 18 is pivotally connected, as by a ball and socket joint, to the end of a pitman arm 20 which is adapted to be moved backward or forward through an arc, by a steering column 22 to the upper end of which is secured the steering wheel. Worm and worm gear mechanism, or other known means, positioned in the box 24 between the steering column and the pitman arm 20 effect the indicated movement of the pitman arm upon the rotation of the steering column 22, all in accord with known practice.

It will be understood that the apparatus described in the preceding several paragraphs is all conventional structure as employed in substantially all vehicles of trackless character today. The apparatus described provides positive manually steerable linkage of known character. The power steering apparatus of my invention is adapted to be associated with the manual steering linkage just described. Particularly, I provide a prime mover, which may take a variety of forms, but which is most conveniently in the form of a fluid pressure motor 26 which is pivotally connected as by ball and socket joints, between the right hand steering knuckle 14 and the frame (not shown) of the vehicle. Forward or reverse movement of the fluid pressure motor 26 effects positive power steering of the king pins 12 and of the vehicle in a manner which will be more fully understood as the description proceeds. The fluid pressure motor 26 may be of the sub or super atmospheric type, dependent upon the character of the pressure source available on the vehicle. Preferably super atmospheric pressure air is employed, and the invention will so be described. Details of the fluid pressure motor 26 are not important, suffice it to say that the motor includes a cylinder slidably receiving a piston carrying a double cup or other packing means so that pressure applied to one side or the other of the piston will move it toward one end or the other of the cylinder. I preferably use a fluid pressure motor of the type having the piston rod extending through the piston, and having a bearing at both ends of the cylinder so that the fluid pressure motor is better adapted to take inertia shocks occasioned by vehicle travel. This largely eliminates any tendency of the piston to bind in the cylinder by getting out of line even though the fluid pressure motor is supported on the steering knuckle 14 and on the frame of the vehicle at points several feet or more apart.

It will be appreciated that if the manual steering mechanism is in the form of a right hand drive that the fluid pressure motor 26 will be positioned on the other side of the vehicle motor and will be secured to the left hand steering knuckle 14. Thus, and regardless of whether or not left hand or right hand steering is employed on the vehicle the fluid pressure motor of the power steering apparatus can be mounted on the opposite side of the vehicle motor away from the manual steering linkage to thereby greatly facilitate the installation of the power steering apparatus.

The fluid pressure motor 26, or other prime mover, is adapted to be controlled by a control valve indicated as a whole by the numeral 30, which valve controls the flow of air under pressure to one side or the other of the piston of the fluid pressure motor. The control valve 30, which is mounted in close association with the fluid pressure motor 26, for example either on the fluid pressure motor, or on the frame or motor of the vehicle, with flexible conduits running between the control valve and the fluid pressure motor, is in turn controlled by electric switches associated with the manual steering linkage. The electric switch means, illustrated in alternative form in Figs. 3 and 4, will be described after the details of the control valve 30.

The control valve, indicated generally by the numeral 30, and best illustrated in Fig. 2, includes a casing 32 to each and opposite ends of which are secured identical electric solenoids 34 and 36 which electrically control the action of plungers 38 and 40. Secured between the casing 32 and each solenoid is a rubber or other diaphragm 41 and 42, and to the center of each diaphragm is secured a hollow metal tube 44 and 46. The plungers 38 and 40 of the solenoids are provided with rubber plugs 50 and 52 at their ends remote from the diaphragms, and compression springs 53 and 54 normally urge the plungers 38 and 40 away from the casing 32 so that the plugs 50 and 52 close air outlets 60 and 62 at the ends of the casing parts surrounding the solenoids.

The other ends of the plungers 38 and 40 carry rubber or other plugs 64 and 66 which are adapted to seal with the ends of the tubes 44 and 46 when the diaphragms 41 and 42 are urged outwardly towards the solenoids and when the plungers are moved inwardly against the action of the springs 53 and 54 by energizing the solenoids.

Compressed air is introduced into a chamber 70 inside of the casing 32 by a conduit 72, and chamber 70 has branch openings 74 and 76 terminating in valve seats 78 and 80 which are adapted to be engaged by rubber button members 82 and 84 carried by the inwardly directed ends of the tubes 44 and 46 respectively. The branch 74 of the chamber 70 extends to a passage 86 connected to a conduit 88 which runs to one end of the fluid pressure motor 26. The chamber 76 is connected to the passage 90 to which is connected a conduit 92 running to the other end of the fluid pressure motor 26.

The operation of the control valve 30 is as follows:

Air under pressure as supplied by the conduit 72 enters the chamber 70 and the branches 74 and 76. The air under pressure flows through the tube 46 and to the left hand side of the diaphragm 42. Solenoid 36 is not energized so that spring 53 holds the plug 66 away from closing the end of the tube 46 and the pressure of the air to the left of the diaphragm 42 moves the diaphragm and tube to the right to forcibly engage the rubber button 84 with the valve seat 78 to cut off any flow of compressed air to the passage 86. Any air under pressure in the passage 86, conduit 88 or to the left of the piston in the fluid pressure motor 26 escapes from the passage 86 around the tube 46 and out the openings marked 94. The compressed air to the left of the diaphragm 42 cannot flow out the opening 62 in the casing of the solenoid because the plug 52 on the end of the plunger 40 closes off the opening 52.

Looking now to the mechanism on the right hand side of the control valve the solenoid 34 is energized to move the plunger 38 to the left against the action of the spring 54. This brings plug 64 into engagement with the end of the tube 44 to prevent the flow of compressed air through the center of the tube 44. The compressed air in the chamber 70 and the branch 76 then exerts a pressure over the face of the button 82 to move the tube 44 and diaphragm 41 to the right. Any back pressure of air in the solenoid 34 is relieved by the air escaping out the opening 60 which has been uncovered by the plug 50 moving with the plunger 38 to the left. With the parts in this position compressed air flows from the chamber 70 through the branch 76 into the passage 90 into the conduit 92 and against the right hand side of the piston of the fluid pressure motor 26. Thus, the piston in the fluid pressure motor moves to the left to effect the desired steering action. The size of the various chambers and passages in the control valve is such that the piston in the fluid pressure motor is given the desired speed movement, namely, a movement which is neither too fast or too slow but which substantially corresponds to the normal speed of movement which can be given to the wheels by the manual steering mechanism.

Movement of the piston to the left in the fluid pressure motor 26 continues until such time as the solenoid 34 is deenergized at which time compression spring 54 moves the plunger 38 to the right to cause plug 50 to cut off opening 60 and to move plug 64 away from sealing relation with the right hand end of tube 44. Compressed air then flows through the center of the tube 44 to the right hand side of the diaphragm 41 to move the diaphragm 41 and the tube 44 to the left to bring button 82 into engagement with the valve seat 80 to cut off the flow of compressed air to the passage 90 and conduit 92. Simultaneously, compressed air in the conduit 92 and passage 90 is free to flow out of the openings 96 to the atmosphere. Thus, atmospheric pressure will prevail on both sides of the piston in the fluid pressure motor 26. It is to be noted that a partition member 98 is provided on the right hand side of the casing 32 and a partition member 100 is used on the left hand side of the casing 32 which partition members act as stops and valve seats for the rubber buttons 82 and 84 to shut off the flow of compressed air out through the openings 94 and 96 when the buttons 84 and 82 are moved into engagement with their respective partition members.

If the solenoid 36 is energized instead of the solenoid 34 the action is directly the opposite of that just described. Specifically, energizing the solenoid 36 will result in the flow of compressed air through the conduit 88 to the left hand side of the piston in the fluid pressure motor 26, and the right hand end of the fluid pressure motor will be connected through conduit 92 with the atmosphere by the openings 96. In this manner the control valve 30 functions to supply compressed air to either one end or the other of the fluid pressure motor upon the electric switch actuation of either the solenoid 34 or 36. When neither solenoid 34 nor 36 are energized the flow of compressed air is cut off to the fluid pressure motor and both ends thereof are connected with atmospheric pressure so that manual steering will prevail.

Fig. 5 diagrammatically illustrates the function and operation of the switch means for controlling the operation of the solenoids 34 and 36 which in turn control the control valve 30. In Fig. 5 the numeral 110 indicates diagrammatically a double-throw switch, sometimes called a micro-switch, i. e., one operating upon relatively small movement of the actuating means. The switch is adapted to be connected to terminals 112 comprising a source of electric power. Specifically, the terminals 112 are preferably connected into the vehicle ignition system including ignition switch 113 and battery 115, so that unless the ignition switch is in "on" position no electric current will be supplied to the terminals 112. Thus, when the arm 114 of the switch is moved in one direction the solenoid 36 is energized, and when moved in the opposite direction the solenoid 34 is energized. When the switch arm 114 is in neutral position neither of the solenoids are energized.

The switch means 110 can be incorporated with the manual steering mechanism in a variety of ways. One convenient manner of achieving this end is illustrated in Fig. 4 wherein the switch 110 is secured to an integral extension 116 of the steering wheel hub. The rim 118 of the steering wheel is secured to the hub by somewhat flexible spokes 120 and a rigid finger 122 made integral with the steering wheel rim 118 adapted to engage the arm 114 of the switch so as to throw the switch in one direction or the other. When the spokes 120 of the steering wheel are not being stressed the finger 122 holds the arm 114 of the switch in neutral position. In this construction when the rim 118 of the steering wheel is moved in clock-wise direction the solenoid 34 is energized to operate the control valve 30 which in turn supplies the compressed air to the fluid motor 26 to turn the wheels of the vehicle to the right. Of course, the manual steering linkage will follow movement of the power steering apparatus. The vehicle will continue to turn to the right until such time as the rim 118 of the steering wheel is moved to throw the arm 114 of the switch in the opposite direction to de-energize the solenoid 34 and to energize the solenoid 36 at which time the wheels of the vehicle will be moved to the left. This movement continues until the operator moves the rim 118 of the steering wheel to a position to move the arm 114 of the switch 110 to neutral position.

An alternative apparatus for controlling the operation of the switch is illustrated in Fig. 3 of the drawings. In this control embodiment of my invention the pitman arm 20 is connected to the drag link 18 by a lost-motion device including a tube 130 having an end secured, as by threads 132 to the end of the drag link 18. The side of the tube 130 is formed with an appropriate aperture 134 through which extends a ball 136 carried by the end of the pitman arm 20. A pair of seats 138 and 140 having recesses to receive the ball 136 are slidably carried by a cage 142 in turn slidably received inside the tube 130. The seats 138 and 140 are resiliently urged into engagement with the ball 136 by a take-up spring 144 which engages with a plug 146 threaded into the end of the cage 142. A boss 148 on the plug prevents any excessive movement of the seat 138 upon movement to the right of the pitman arm 20.

The cage 142 is provided with an integral rod 150 threaded on its end to receive a nut 152 having a shoulder 154 formed thereon. Between the nut 152 and the cage 142 is provided a washer 156, a compression spring 158, and a washer 160. The tube 130 is formed with an inwardly directed shoulder 162 and a ring 164 which is conveniently clamped, in the manner shown, between the tube 130 and the drag link 18. A micro-switch 110a, having an operating arm 114a, is mounted in the end of the tube 130 remote from the drag link 18, and is held in position therein by a snap ring 170, so that the operating arm 114a engages with the end of the cage 142 in the manner shown in the drawing.

The operation of the switch means of Fig. 3 is as follows:

When the pitman arm 20 is moved to the left by the manual steering linkage as operated by the steering wheel, the cage 142 is moved to the left and the shoulder 172 of the cage engages with the washer 160 which contacts the spring 158 which in turn contacts the washer 156 engaging with the shoulder-washer 164 to move the drag link 18 to the left. In attempting to transfer the steering force described the spring 158 is compressed which will allow the cage 142 to move to the left relative to the tube 130 until such time as the shoulder 174 on the end of the cage engages with the shoulder 162 on the tube 130. This relative movement of the cage with respect to the tube 130 permits operating arm 114a of the micro-switch 110a to move to the left to energize the electric solenoid of the control valve 30 to thereby cause the power steering apparatus to move the vehicle wheels in the desired direction.

On the other hand, when the pitman arm 20 is moved to the right the cage 142 is moved to the right and the nut 152 acting through washer 156, compression spring 158 and washer 160 attempts to move the tube 130 to the right. The compressing of the spring 158 allows the cage 142 to move to the right relative to the tube 130 to move the operating arm 114a of the micro-switch 110a to the right to operate the other solenoid in the control valve 30, thereby to cause the fluid pressure motor 26 to positively move the wheels of the vehicle in the opposite direction. Normally the compressed spring 158 holds the cage 142 in a middle position with respect to the tube 130 so that the control arm 114a of the micro-switch is held in neutral position.

It will be understood that in utilizing the switch means of Fig. 3 that the tube 130 and associated parts will be substituted for the corresponding conventional member normally employed in a vehicle to connect the pitman arm 20 with the drag link 18.

From the foregoing, it will be recognized that the various objects of my invention have been achieved by the provision of a simplified, relatively inexpensive, substantially fool-proof power steering apparatus characterized by simplicity of installation and positiveness and facility of operation. Electric switch means incorporated with the manual steering mechanism serves as the control for a valve in turn controlling the operation of a prime mover positioned on the side of the vehicle motor remote from the manual steering mechanism. My approved apparatus is adapted equally to installation as production equipment or to installation in the field as optional equipment. Likewise, it is adapted for use on vehicles having either a right or a left hand manual steering mechanism.

While in accord with the patent statutes I have specifically illustrated and described one embodiment of my invention, it should be particularly understood that I am not to be limited thereto or thereby, but that the scope of my invention is defined in the amended claims.

I claim:

1. Power steering apparatus for vehicles comprising a fluid pressure motor connected to the steerable vehicle wheels, a control valve for the motor including a casing, means for supplying compressed air to the casing, separate conduits for conducting air to or from the casing to the opposite ends of the motor, a pair of diaphragm valves in the casing each controlling the flow of air in one of said conduits, each diaphragm valve being normally held by compressed air in a position to close the flow of compressed air to the conduit associated with the diaphragm valve, and to connect the conduit with the atmosphere, an electric solenoid associated with each diaphragm valve and adapted when energized to effect a change of direction of application of compressed air to the diaphragm valve to connect the associated conduit with the compressed air, manual steering apparatus, and electric switch means in the manual steering apparatus for selectively controlling the energizing of the solenoids.

2. Power steering apparatus for vehicles comprising a fluid pressure motor connected to steer the vehicle wheels, a control valve for the motor including a casing, means for supplying compressed air to the casing, separate conduits for conducting air to or from the casing to opposite ends of the motor, a pair of diaphragm valves in the casing each controlling the flow of air in one of said conduits, each diaphragm valve being normally held by compressed air in a position to close the flow of compressed air to the conduit associated with the diaphragm valve, and to connect the conduit with the atmosphere, a plunger associated with each diaphragm valve and adapted when operated to effect a change of direction of application of compressed air to the diaphragm valve to connect the associated conduit with the compressed air, manually operated means connected to steer the vehicle wheels and electric switch means controlled by movement in one direction or the other of the manually operated means for controlling the operation of the plungers.

3. Control mechanism for power steering apparatus for vehicles and the like including a fluid pressure motor, a casing, means for supplying compressed air to the casing, separate conduits for conducting air to or from the casing to opposite ends of the motor, a pair of diaphragm valves in the casing each controlling the flow of air in one of said conduits, each diaphragm valve being normally held by compressed air in a position to close the flow of compressed air to the conduit associated with the diaphragm valve and to connect the conduit with the atmosphere, an electric solenoid associated with each diaphragm valve and adapted when energized to transfer the pressure of the compressed air to the other side of the diaphragm valve to move the valve to supply compressed air to the conduit associated with the valve, manually operated means connected to steer the vehicle wheels and switch means controlled by movement in one direction or the other of the manually operated means controlling the operation of the solenoids.

4. Control mechanism for power steering apparatus for vehicles and the like including a fluid pressure motor connected to steer the vehicle wheels, a casing, means for supplying compressed air to the casing, separate conduits for conducting air to or from the casing to opposite ends of the motor, a pair of diaphragm valves in the casing each controlling the flow of air in one of said conduits, each diaphragm valve being normally held by compressed air in a position to close the flow of compressed air to the conduit associated with the diaphragm valve and to connect the conduit with the atmosphere, plunger means associated with each diaphragm valve and adapted when operated to transfer the pressure of the compressed air to the other side of the diaphragm valve to move the valve to supply compressed air to the conduit associated with the valve, manually operated means connected to steer the vehicle wheels and means controlled by movement in one direction or the other of the manually operated means controlling the operation of the plunger means.

ORPHEUS F. QUARTULLO.

REFERENCES CITED

The following references are of record in the file of this patent:

UNITED STATES PATENTS

| Number | Name | Date |
|---|---|---|
| 1,364,872 | Feightner | Jan. 11, 1921 |
| 1,377,306 | Brush | May 10, 1921 |
| 1,974,922 | La Croix | Sept. 25, 1934 |
| 2,018,197 | Vorech et al. | Oct. 22, 1935 |
| 2,032,146 | Neveu | Feb. 25, 1936 |
| 2,095,922 | Creahan | Oct. 12, 1937 |
| 2,146,468 | Doolan | Feb. 7, 1939 |
| 2,230,361 | Morin et al. | Feb. 4, 1941 |
| 2,322,911 | Beam | June 29, 1943 |
| 2,356,492 | Smith | Aug. 22, 1944 |
| 2,424,288 | Severy | July 22, 1947 |

FOREIGN PATENTS

| Number | Country | Date |
|---|---|---|
| 563,664 | Germany | Nov. 8, 1932 |
| 624,978 | France | July 30, 1927 |